US012589490B2

(12) United States Patent
Gemignani et al.

(10) Patent No.: US 12,589,490 B2
(45) Date of Patent: Mar. 31, 2026

(54) CAPABILITIES FOR ERROR CATEGORIZATION, REPORTING AND INTROSPECTION OF A TECHNICAL APPARATUS

(71) Applicant: Magazino GmbH, Munich (DE)

(72) Inventors: Guglielmo Gemignani, Munich (DE); Markus Grimm, Munich (DE); Moritz Tenorth, Munich (DE)

(73) Assignee: Jungheinrich AG, Hamburg (DE)

( * ) Notice: Subject to any disclaimer, the term of this patent is extended or adjusted under 35 U.S.C. 154(b) by 562 days.

(21) Appl. No.: 17/890,875

(22) Filed: Aug. 18, 2022

(65) Prior Publication Data

US 2023/0068323 A1 Mar. 2, 2023

(30) Foreign Application Priority Data

Aug. 31, 2021 (EP) ..................................... 21194167

(51) Int. Cl.
*B25J 9/16* (2006.01)
*G05B 23/02* (2006.01)
(52) U.S. Cl.
CPC ........ *B25J 9/1602* (2013.01); *G05B 23/0297* (2013.01); *G05B 2223/06* (2018.08)
(58) Field of Classification Search
CPC .... B25J 9/1602; B25J 9/1664; G05B 23/0279
See application file for complete search history.

(56) References Cited

U.S. PATENT DOCUMENTS

| | | | |
|---|---|---|---|
| 2004/0153212 A1 | 8/2004 | Profio et al. | |
| 2005/0138544 A1 | 6/2005 | Beck et al. | |
| 2017/0161035 A1 | 6/2017 | Abadi et al. | |

FOREIGN PATENT DOCUMENTS

| | | |
|---|---|---|
| CN | 103838563 A | 6/2014 |
| CN | 105117575 A | 12/2015 |
| EP | 3214510 A1 | 9/2017 |
| JP | 2004114285 A | 4/2004 |

(Continued)

OTHER PUBLICATIONS

"Extended European Search Report received in EP Application No. 21155238.5 on Jul. 19, 2021".

(Continued)

*Primary Examiner* — Lam S Nguyen
(74) *Attorney, Agent, or Firm* — ALG Intellectual Property, LLC

(57) ABSTRACT
An apparatus state data structure for controlling a technical apparatus includes at least one capability data field and at least one associated data field. Each capability data field indicates a respective functionality of the technical apparatus. Each associated data field is associated with a respective capability data field. The at least one associated data field includes at least one required component state data field and at least one required diagnostic data field. Each required component state data field indicates a configuration of a respective component required for the functionality of the capability data field associated with the respective required component state data field. Each required diagnostic data field indicates a respective operational state of a component of the technical apparatus required for the functionality of the capability data field associated with the respective required diagnostic data field.

37 Claims, 5 Drawing Sheets

(56) References Cited

FOREIGN PATENT DOCUMENTS

JP        2009230569 A      10/2009
WO       2017121747 A1      7/2017

OTHER PUBLICATIONS

Berenz, et al., "Reactive Programming for Orchestrating Robotic Behavior", IEEE Robotics & Automation Magazine, IEEE Service Center, Piscataway, NJ, US, vol. 25, No. 3, Sep. 1, 2018, pp. 49-60, (retrieved on Sep. 13, 2018).

Champandard, et al., "The Behaviour Tree Starter Kit", Game AI Pro Collected Wisdom of Game AI Professionals, (2014), pp. 73-91, URL: http://file.allitebooks.com/20150721/Game%20AI%20Pro-%20Collected%20Wisdom%20of%20Game%20AI%20Professionals. pdf, (Aug. 24, 2016), XP002761049 [A] 1-15 p. 73-p. 91 2014.

Foote, et al., "Diagnostic System for Robots Running ROS", Internet, URL: [https://www.ros.org/reps/rep-0107.html], Created Nov. 27, 2010.

Marzinotto, et al.,"Towards a Unified Behavior Trees Framework for Robot Control", 2014 IEEE International Conference on Robotics and Automation (ICRA). IEEE, 2014.

Tenorth, et al., "The RoboEarth language: Representing and Exchanging Knowledge about Actions, Objects, and Environments", (retrieved from: https://ias.in.tum.de/_media/spezial/bib/tenorth12roboearth. pdf), 2012 IEEE International Conference on Robotics and Automation, 2012, pp. 1284-1289, doi: 10.1109/ICRA.2012.6224812.

Wikipedia, et al., "Behavior tree (artificial intelligence, robotics and control)", Internet, (Jan. 13, 2016), URL: https://en.wikipedia.org/w/index.php?title=Behavior_tree_(artificial_intelligence,_robotics_and_control)&oldid=699680860, (Aug. 23, 2016), XP002761048 [X] 1-15.

Anonymous, et al., "Behavior Tree (Artificial Intelligence, Robotics and Control)—Wikipedia", Dec. 18, 2020, XP055822529, retrieved from the internet: https://en.wikipedia.org/w/index.php?title=Behavior_tree_(artificial_intelligence,_robotics_and_control)&oldid:994954127 (retrieved on Jul. 8, 2021).

```
name: can_navigate
required_diagnostics:
  - ...
  - name: laser_data_available
    diagnostic_name: /laser_data_available
    fail_on_stale: true
    fail_on_warn: false
```

(a)

40

```
error_explanations:is_error_explanation(laser_data_missing,1001).
error_explanations:error_explanation_description(laser_data_missing,
'The lasers are not publishing data').
error_explanations:error_explanation_properties(laser_data_missing,
[diagnostic_error('
/laser_data_available')]).
```

CAPABILITIES FOR ERROR CATEGORIZATION, REPORTING AND INTROSPECTION OF A TECHNICAL APPARATUS

RELATED APPLICATIONS

The present application claims priority to European Patent Application No. EP21194167, filed Aug. 31, 2021, the contents of which are hereby incorporated by reference in their entirety.

BACKGROUND INFORMATION

The present disclosure generally relates to the operating of technical apparatuses, such as, autonomous vehicles, e.g., robots. In particular, the present disclosure relates to methods, systems and devices using a state representation of the technical apparatus for controlling the technical apparatus. The technical apparatus can preferably be an autonomous vehicle, e.g., a robot. However, it will be understood that principles of the present disclosure apply similarly to other technical apparatuses, such as, stationary robots or apparatuses, e.g., robot arms with sensors and actuators. In general, the technical apparatus can be any apparatus that may gain or lose capabilities depending on their status.

Generally, robots operate in dynamic environments facing complex situations. As such, it is particularly important for robots to be able to reason on themselves and recognize anomaly situations with respect to normal operations. With this ability, the robots can signal any situation that they cannot handle on their own, explain what is currently hindering them from achieving their assigned tasks, and, in some cases, ask humans for help to restore a normal operation state.

An anomaly situation can be an anomaly regarding the environment in which the robots are operating or an anomaly regarding the robot itself. The former type of anomalies refers to situations where the robot is not able to achieve a given task due to a particular wrong configuration of the environment. Examples of such anomalies are: the robot cannot navigate to a certain requested position because the path to it is blocked, or the robot cannot pick up an item because it is not found where it was supposed to be. The second type of anomaly refers, instead, to situations where the robot has something hindering it to complete a task. It could be that the robot has a malfunctioning software or hardware component, a particular state that prevents it to operate, or a critical situation of danger detected that may require the immediate interruption of any movement.

For example, malfunctioning software or hardware components preventing operation may include the following anomaly situations: the robot could have lost the connection to a motor or to a camera, the robot could be delocalized due to an issue in the localization algorithm, the robot could have a dirty sensor causing wrong readings, or the robot could have a broken battery that prevents operation. Some exemplary anomaly situations wherein the robot or robot component state prevents operation may include: a safety/emergency stop mechanism might be preventing the robot to operate, or the battery might be discharged and needs to be recharged. Critical situation preventing operation may for example include: something got hit by the robot while operating resulting in an overcurrent event detected by a motor, or a particular motor might not be following the requested commands.

SUMMARY

The present disclosure, is particularly focused on categorizing, reporting and introspecting the second type of anomalies, which can also be referred to as robot errors.

Present technologies in the art typically make use of Diagnostic System for Robots Running ROS, such as, for example, the opensource project in https://www.ros.org/reps/rep-0107.html. However, such systems merely focus on error identification and reporting.

Another concept in literature is "The RoboEarth language: Representing and Exchanging Knowledge about Actions, Objects, and Environments" by Moritz Tenorth, Alexander Perzylo, Reinhard Lafrenz and Michael Beetz, from the Department of Informatics at Technische Universitat Munchen (retrieved from: https://ias.in.tum.de/_media/spezial/bib/tenorth12roboearth.pdf). In this work, dependencies of actions on capabilities are provided using a rule-based approach, but the capabilities are considered static and not calculated at runtime from the current robot state.

In light of the above, features of the present disclosure seek to overcome or at least alleviate the shortcomings and disadvantages of the known implementations. It is an object of the features of the present disclosure to provide an improved representation of the state of a technical apparatus, to utilize it for controlling the technical apparatus and to provide a basis to introspect the technical apparatus.

These objects are met by the robot and the method of the present disclosure.

In a first aspect the present disclosure relates to a method of operating a technical apparatus, which can for example be a mobile robot. The method comprises using an apparatus state data structure, which can also be referred to as a vehicle state data structure (e.g., in case the technical apparatus is an autonomous vehicle) or as a robot state representation (e.g., in case the technical apparatus is a robot), for controlling the technical apparatus. The apparatus state data structure comprises at least one capability data field and at least one associated data field. Each capability data field indicates a respective functionality of the technical apparatus and each associated data field is associated with a respective capability data field.

The technical apparatus may be an autonomous vehicle.

In a second aspect, the present disclosure relates to a system comprising the technical apparatus and a memory device configured to store the apparatus state data structure for controlling the technical apparatus.

In a third aspect, the present disclosure relates to a computer program product comprising instructions which, when the program is executed by a computer, causes the computer to carry out the method of the present disclosure.

In a fourth aspect, the present disclosure relates to a computer readable storage medium having stored thereon the computer program product of the present disclosure.

In a fifth aspect, the present disclosure relates to a computer readable storage medium having stored thereon the apparatus state data structure.

In some embodiments, the technical apparatus can be an autonomous vehicle. In such embodiments, the technical apparatus can be referred to as an autonomous vehicle. Similarly, the apparatus state data structure can be referred to as a vehicle state data structure.

Again, it will be understood that principles of the present disclosure apply similarly to other technical apparatuses, such as, stationary robots or stationary apparatuses, e.g., robot arms with sensors and actuators.

In general, the technical apparatus can be any apparatus that may gain or lose capabilities depending on their status. The technical apparatus may be an autonomous vehicle.

In the following, features of the present disclosure are discussed. For the sake of brevity, some of these features may be discussed in relation to only one of the aspects of the present disclosure. However, it will be understood that the following features of the present disclosure apply mutatis mutandis to each aspect of the present disclosure.

The features of the present disclosure may have multiple advantages. In particular, the apparatus state data structure of the present disclosure may allow for a compact representation or encoding of the apparatus state. It may also allow for efficiently defining errors of the technical apparatus, the apparatus state and their relation to represent anomalies regarding the technical apparatus.

In addition, the features of the present disclosure may facilitate categorizing and explaining the causes of the errors happening on the technical apparatus, for example, with a reasoning system.

Further still, the features of the present disclosure may allow for efficiently checking for anomalies while the technical apparatus executes task(s). In particular, the features of the present disclosure can allow classifying the errors, recovering from them and reporting the errors, e.g., to an external controller.

Simply put, the features of the present disclosure may facilitate determining which capabilities of the technical apparatus can be present (or enabled) at any moment in time. The features of the present disclosure allow for error categorization, reporting and introspection. Overall, the features of the present disclosure may increase the efficiency and safety of operation of a technical apparatus.

In some embodiments, the at least one associated data field can comprise at least one required component state data field. Each required component state data field can indicate a configuration of a respective component required for the functionality of the capability data field associated with the respective required component state data field. That is, each capability data field can be associated with at least one respective component state data field. This can be advantageous as components of the technical apparatus can be operable in multiple states. For example, a gripper can be in an engaging (i.e., gripping) state or it can be in a non-engaging state. Certain functionalities may require that certain components be in certain states. For example, the functionality of gripping an item may require that the gripper is in a non-engaging state. The features of the present disclosure can allow for defining, representing and encoding such requirements (i.e., dependencies between functionalities and component states) based on the association of capability data fields with component state data fields.

In some embodiments, the at least one associated data field can comprise at least one required diagnostic data field. Each required diagnostic data field can indicate a respective operational state of a component of the technical apparatus required for the functionality of the capability data field associated with the respective required diagnostic data field. That is, each capability data field can be associated with at least one respective required diagnostic data field. This can be advantageous as components of the technical apparatus may comprise errors or may be non-operational. For example, a drive motor may not be functioning. Again, certain functionalities may require or may be performed at least in part by certain components. For example, the functionality of moving the technical apparatus may be performed by its drive motor. The features of the present disclosure can allow for defining, representing and encoding such requirements (i.e., dependencies between functionalities and components) based on the association of capability data fields with required diagnostic data fields.

In some embodiments, the at least one associated data field can comprise at least one event storage data field. Each event storage data field can comprise data relating to an event relevant for the respective functionality of the capability data field associated with the respective event storage data field. That is, in some instances functionalities may become disabled by an occurrence of certain events. For example, the gripper while positioning an item may collide with another object. In such cases, it can be advantageous to check the gripper (e.g., manually) before resuming operation. Although the collision may cause an overcurrent in the respective motor of the gripper, as soon as the collision is over, the motor of the gripper goes back into its normal state. Therefore, diagnostic of the gripper will return an operational state, hence making the collision undetectable otherwise (i.e., merely using the above data fields). However, the features of the present disclosure can store data regarding critical events (e.g., collisions). The event storage data field can comprise such data. Therefore, the features of the present disclosure can allow for defining, representing and encoding dependencies between functionalities and critical events based on the association of the capability data fields with event storage data fields.

The event storage data field can comprise a timestamp, an event name and/or an event description.

Each capability data field can comprise a capability key and a capability value. The capability key can comprise a unique identifier corresponding to the respective functionality of the technical apparatus and the capability value can indicates a status of the functionality. For example, the capability key can be of a string data type and the capability value can be of a Boolean data type.

More particularly, the capability value can indicate a presence or absence (i.e., the availability) of the functionality. That is, the capability value can indicate whether a functionality is enabled or disabled.

Each capability data field can indicate the respective functionality of the technical apparatus based on each associated data field associated with the respective capability data field. As discussed, the features of the present disclosure can allow defining, representing and encoding requirements for different functionalities of the technical apparatus by associating capability data fields with respective associated data fields.

Each required component state data field can comprise a component key and a component state value. The component key can comprise a unique identifier corresponding to the respective component and the component state value indicates the configuration of the component. Both the component key and the component state value can be of a string data type.

In addition, the component state data field can comprise a timestamp, which can indicate the time at which the respective component has assumed the indicated component state value.

Each required diagnostic data field can comprise a part of an output of a diagnostic routine.

The method can therefore comprise executing the diagnostic routine.

In some embodiments, the diagnostic routine can be part of a general system diagnostic routine of the technical apparatus. Alternatively, the diagnostic routine can be a general system diagnostic routine of the technical apparatus.

The general system diagnostic routine can generate a respective operational state for each component of the technical apparatus.

The required diagnostic data field can comprise a timestamp, which can indicate the time at which the respective component is in the indicated operational state. It can further comprise a status data field. The status data field can comprise different constants indicating the operational state of the apparatus. For example, the status data field can comprise a respective constant indicating different states, such as, "OK", "WARN", "ERROR" and "STALE". It can further comprise variables for storing the respective constant depending on the state. It can further comprise variables of a string data type for indicating an ID of the component, to which the diagnostic relates, a name of the diagnostic and a diagnostic message.

In some embodiments, data relating to critical events can be stored in a database. That is, the method of the present disclosure can comprise storing in a database data relating to critical events. The system of the present disclosure can further comprise the database. Logging data related to critical events can facilitate identifying error causes, introspection and/or missing functionalities that can be caused by such events. This can be advantageous, as some critical events (e.g., collisions) may leave a trace only during their occurrence, thus making it challenging or even impossible to detect them after they occur.

In such embodiments, each event storage data field can comprise at least one entry of the database.

The method can comprise triggering storage in the database of the data relating to critical events based on an output of at least one sensor of the technical apparatus, for example, when the output of the at least one sensor is outside a respective predetermined normal range. That is, the technical apparatus can comprise at least one sensor, typically a plurality of sensors. An output of at least one of the sensors can trigger the storage in the database of the data relating to critical events. Such data may for example include a timestamp, the sensor output, the name (or ID) of the sensor and/or a location of the sensor. For example, in the event of the gripper colliding with another object, a sensor provided therein may sense the current drawn by the motor. If this current exceeds a predetermined threshold value, storage of data relating to this event can be stored in the database.

Storing in a database data relating to critical events can comprise storing data indicative of a trigger of the storage in the database of the data relating to critical events and data indicative of a task that the technical apparatus was executing when the trigger occurred.

In some embodiments, each capability data field can be associated with at least two associated data fields comprising at least one required state data field and at least one required diagnostic data field. This can facilitate defining, representing and encoding multiple requirements for a functionality.

Further still, in some embodiments, each capability data field can comprise at least three associated data field comprising at least one required state data field, at least one required diagnostic data field and at least one event storage data field.

In some embodiments, the apparatus state data structure can be an apparatus state tree structure, wherein the apparatus state tree structure comprises a plurality of nodes and a plurality of edges connecting the nodes. That is, the apparatus state data structure can be implemented as a tree data structure. In general, using a hierarchical data structure, such as the tree, can be advantageous as it can allow for efficiently encoding the associations, in particular the dependencies, between the different data fields of the apparatus state data structure.

That is, in such embodiments, each of the data fields can be a node of the tree structure. More particularly, each capability data field can be a capability node and each associated data field can be a capability child node.

Moreover, each associated data field can be associated with a respective capability data field such that each associated data field can be a child node of the respective capability data field, the respective capability data field thus being the parent node of the respective capability child node.

The tree structure can comprise a root node and wherein each of the capability nodes can be a child node of the root node.

In some embodiments, the apparatus state data structure can be used to determine the state of the technical apparatus. That is, the apparatus state data structure can be configured to be indicative of the state of the technical apparatus. More particularly, the apparatus state data structure can be configured to be indicative for each functionality of the technical apparatus whether it is present (i.e., enabled) or missing (i.e., disabled).

The method can further comprise determining a state of the technical apparatus using the apparatus state data structure. Determining a state of the technical apparatus can comprise determining for each functionality of the technical apparatus whether it is present or missing.

In some embodiments, the method can further comprise determining a cause for a missing functionality of the technical apparatus using the apparatus state data structure. That is, the apparatus state data structure can be used to determine a cause for a missing functionality. This can be advantageous as it can facilitate determining further actions for recovering the missing functionality and/or allowing the technical apparatus resume operations.

The cause for the missing functionality can be output. This can comprise providing the cause to another process that can be configured to recover the missing functionality. Alternatively or additionally, outputting the cause for the missing functionality can comprise providing it to an operator.

In some embodiments, the method can comprise recovering a missing functionality of the technical apparatus using the apparatus state data structure. That is, the apparatus state data structure can be configured to facilitate not only identifying a missing functionality but also recovering the missing functionality.

In some embodiments, a reasoning system can be utilized to determine a cause for a missing functionality.

The reasoning system can be configured to determine the cause for the missing functionality based on each data field of the apparatus state data structure.

The reasoning system can be implemented using logic programming. More particularly, the reasoning system can comprise logical rules (i.e., predicates) configured to determine the cause for the missing functionality. In some embodiments, the logical rules can be configured to categorize the causes for the missing functionality.

That is, the reasoning system can comprise a plurality of predicates which allow for robot state introspection by utilizing the apparatus state data structure. The reasoning system can comprise capability predicates, critical event predicates, component state predicates and diagnostic predicates. Below a non-exhaustive list of predicates is provided.

For example, one of the capability predicates can be configured to determine whether a capability is present. It can take as input a string representing the name of a capability and can evaluate to true if a capability with the name passed as input is enabled in the apparatus state data structure and can evaluate to false otherwise.

One of the critical event predicates can be configured to determine whether a particular critical event has occurred. It can take as input a string representing the name of a critical event and can evaluate to true if a critical event with the name passed in input is present in the apparatus state data structure and can evaluate to false otherwise.

Another one of the critical event predicates can be configured to determine whether a critical event has occurred. It can evaluate to true if a critical event has occurred and to false otherwise.

One of the component state predicates can be configured to determine whether a component is in a certain state. It can take as input a string representing a component state name and can evaluates to true if a component state with the name passed as input is present in the apparatus state data structure and can evaluate to false otherwise.

Another one of the component state predicates can be configured to determine whether a component state required for a capability is missing. It can take as input a string representing a component state name. It can evaluate to true, if a capability requires the component state with the name passed as input and such a component state is not part of the apparatus state data structure. It can evaluate to false otherwise.

One of the diagnostic predicates can be configured to determine the state of the diagnostic. It can take a diagnostic name and state as input and can evaluate to true if the input diagnostic is in the input state and can evaluate to false otherwise.

The logical rules of the reasoning system can comprise logical operations on the data fields of the apparatus state data structure.

Hence, the reasoning system can be configured to receive the apparatus state data structure as input. It can further perform operations, e.g., logical operations, on the data fields of the apparatus state data structure to determine a cause for a missing functionality.

The method can further comprises using an executor application.

The executor application can be configured for controlling the mobile robot. More particularly, the executor application can be configured to control the execution of different tasks of the technical apparatus.

The executor application can be, e.g., a state machine executor application or a behavior tree executor application.

The executor application can determine the state of the technical apparatus using the apparatus state data structure.

The executor application can determine to execute tasks based on the determined state of the technical apparatus. That is the executor application can be configured to utilize the apparatus state data structure to determine the state of the technical apparatus and based thereon the executor application can determine to execute tasks. This can be advantageous as it can allow the executor application to determine whether required capabilities are present prior and/or while executing a task.

In some embodiments, the executor application can execute a task and can simultaneously determine the state of the technical apparatus using the apparatus state data structure. That is, the executor application can determine at run time (i.e., while executing a task) whether required capabilities are present.

Upon determining that a functionality is missing, the executor application can call a missing capability handler routine to determine a handling routine. The handling routine can comprise recovering the missing capabilities.

The handling routine may also comprise generating a request for manual support. This can be particularly advantageous in case the handling routine may not be able to recover a missing capability.

The executor application may also call the reasoning system to determine a cause for a missing functionality, upon determining that a functionality is missing. This can be advantageous as it can allow the executor application to obtain more detailed information regarding the missing functionality. Therefore, the executor application can make a more accurate determination about the next task to execute. For example, calling the reasoning system may facilitate determining an accurate handling routine for recovering the missing capability.

In some embodiments, the missing capability handler routine can determine the handling routine based on the output of the reasoning system.

In some embodiments, the executor application can comprise a state generator node configured to generate the apparatus state data structure.

The state generator node can be a process.

The state generator node can generate the apparatus state data structure periodically. For example, the state generator node can generate the apparatus state data structure with a frequency of at least 1 Hz.

In some embodiments, the state generator node can generate the apparatus state data structure according to an adaptive frequency. The adaptive frequency can depend on at least one of the capability data fields and/or on at least one of the associated data fields. This can be advantageous, as when critical events are detected and/or when a diagnostic turn to an error state, the frequency can be increased.

The executor application can comprise a plurality of process nodes. The state generator node can be one of the process nodes. Another process node can be one that triggers at least one sensor and receives the output of the at least one sensor. The at least one sensor can, for example, be configured to measure and output data indicative of a configuration and/or operational state of a respective component of the apparatus. Yet another process node can be one that is configured to receive (or read) data comprised by at least one event storage data field. Yet another process node can be a diagnostic routine. The state generator node can be configured to receive the output of at least one other process node to generate the apparatus state data structure.

More particularly, the plurality of process nodes can be configured to exchange messages with each other. Such messages can be, e.g., robot operating system (ROS) messages. The plurality of process nodes can be interconnected with each other via channels that allow them to exchange messages, hence forming a network of process nodes. The apparatus state data structure can be such a message and it can be published by the state generator node. The state generator node can retrieve the necessary information for generating the apparatus state structure via a set of callbacks that listen on different channels in the network of process nodes. The state generator node can publish (i.e., generate and/or output) the apparatus state data structure with a minimum frequency of 1 Hz. The state generator node can publish also at a higher frequency when a sudden change is detected (e.g., a critical event is received or a diagnostic turn to an error state).

In some embodiments, the method can comprise storing in a memory device the apparatus state data structure.

For example, in such embodiments, the state generator node can be configured to generate and store the apparatus state data structure.

The method can further comprise storing a respective timestamp associated to the apparatus state data structure, wherein the respective timestamp can be configured to indicate a time of generation of the apparatus state data structure.

In such embodiments, the method can comprise determining a past state of the technical apparatus using a stored apparatus state data structure. That is, storing the apparatus state data structure in a database and/or in a memory device can allow reasoning on the apparatus state data structure that was recorded at a certain point in the past, when, for example, an error occurred. This can be advantageous as it can allow to perform an ex post facto analysis As discussed, the capability data fields can indicate respective functionalities of the technical apparatus. Below some exemplary functionalities are provided.

One of the at least one capability data field can indicate a driving functionality of the technical apparatus.

One of the at least one capability data field can indicate a navigation functionality of the technical apparatus.

One of the at least one capability data field can indicate an object localization functionality of the technical apparatus.

One of the at least one capability data field can indicate an object manipulation functionality of the technical apparatus.

The technical apparatus can comprise a drive unit configured to move the technical apparatus.

The technical apparatus can comprise a pick up unit configured to pick up at least one object. The pick up unit comprises at least one gripper.

The technical apparatus can comprise a shelf unit configured to store at least one object.

The technical apparatus can comprise an emergency button.

The technical apparatus can comprise a sensor. Typically, the technical apparatus can comprise a plurality of sensors.

The technical apparatus can be configured to pick up objects. For example, the technical apparatus can be configured to pick up items, e.g., shoe boxes, in a storage facility.

The method can be a computer implemented method.

The method can be performed by a system comprising the technical apparatus and a processor. The system further can further comprise a memory device.

The technical apparatus can be a robot.

In some embodiments, the technical apparatus can comprise the processor.

The system of the present disclosure can be configured to carry out the method of the present disclosure.

The apparatus state data structure stored in the memory device of the system can comprise any of the features of the apparatus state data structure used by the method of the present disclosure.

In some embodiments of the system, the technical apparatus can comprise the memory device.

The memory device can be configured to further store the reasoning system.

The memory device can be configured to further store the executor application.

The system further can further comprise a processor. In some embodiments, the technical apparatus can comprise the processor. The processor can be configured to execute the method.

The technical apparatus can be a robot.

The features of the present disclosure are further described with the following numbered embodiments.

Below method embodiments will be discussed. These embodiments are abbreviated by the letter "M" followed by a number. Whenever reference is made to method embodiments, these embodiments are meant.

M1. A method of operating a technical apparatus, wherein the method comprises using an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field.

M2. The method according to the preceding embodiment, wherein the at least one associated data field comprises at least one required component state data field, wherein each required component state data field indicates a configuration of a respective component required for the functionality of the capability data field associated with the respective required component state data field.

M3. The method according to any of the preceding embodiments, wherein the at least one associated data field comprises at least one required diagnostic data field, wherein each required diagnostic data field indicates a respective operational state of a component of the technical apparatus required for the functionality of the capability data field associated with the respective required diagnostic data field.

M4. The method according to any of the preceding embodiments, wherein the at least one associated data field comprises at least one event storage data field, wherein each event storage data field comprises data relating to an event relevant for the respective functionality of the capability data field associated with the respective event storage data field.

M5. The method according to any of the preceding embodiments, wherein each capability data field comprises a capability key and a capability value, wherein the capability key comprises a unique identifier corresponding to the respective functionality of the technical apparatus and the capability value indicates a status of the functionality.

M6. The method according to the preceding embodiment, wherein the capability value indicates a presence or absence of the functionality.

M7. The method according to any of the preceding embodiments, wherein each capability data field indicates the respective functionality of the technical apparatus based on each associated data field associated with the respective capability data field.

M8. The method according to any of the preceding embodiments and with the features of embodiment M2, wherein each required component state data field comprises a component key and a component state value, wherein the component key comprises a unique identifier corresponding to the respective component and the component state value indicates the configuration of the component.

M9. The method according to any of the preceding embodiments and with the features of embodiment M3, wherein each required diagnostic data field comprises a part of an output of a diagnostic routine.

M10. The method according to the preceding embodiment, wherein the method comprises executing the diagnostic routine.

M11. The method according to any of the 2 preceding embodiments, wherein the diagnostic routine is part of a general system diagnostic routine of the technical apparatus.

M12. The method according to any of the preceding embodiments with the features of embodiment M9 or M10, wherein the diagnostic routine is a general system diagnostic routine of the technical apparatus.

M13. The method according to the preceding embodiment, wherein the general system diagnostic routine generates a respective operational state for each component of the technical apparatus.

M14. The method according to any of the preceding embodiments and with the features of embodiment M4, wherein the method comprises storing in a database data relating to critical events and wherein each event storage data field comprises at least one entry of the database.

M15. The method according to the preceding embodiment, wherein the method comprises triggering storage in the database of the data relating to critical events based on an output of at least one sensor of the technical apparatus.

M16. The method according to the preceding embodiment, wherein the method comprises triggering storage in the database of the data relating to critical events when the output of the at least one sensor is outside a respective predetermined normal range.

M17. The method according to any of the 3 preceding embodiments, wherein storing in a database data relating to critical events comprises storing data indicative of a trigger of the storage in the database of the data relating to critical events and data indicative of a task that the technical apparatus was executing when the trigger occurred.

M18. The method according to any of the preceding embodiments and with the features of embodiments M2 and M3, wherein each capability data field is associated with at least two associated data fields comprising at least one required state data field and at least one required diagnostic data field.

M19. The method according to any of the preceding embodiments and with the features of embodiments M2, M3 and M4, wherein each capability data field comprises at least three associated data field comprising at least one required state data field, at least one required diagnostic data field and at least one event storage data field.

M20. The method according to any of the preceding embodiments, wherein the apparatus state data structure is an apparatus state tree structure, wherein the apparatus state tree structure comprises a plurality of nodes and a plurality of edges connecting the nodes.

M21. The method according to the preceding embodiment, wherein each of the data fields is a node of the tree structure.

M22. The method according to any of the 2 preceding embodiments, wherein each associated data field is associated with a respective capability data field such that each associated data field is a child node of the respective capability data field, the respective capability data field thus being the parent node of the respective capability child node.

M23. The method according to the preceding embodiment, wherein each capability data field is a capability node, and each associated data field is a capability child node.

M24. The method according to the preceding embodiment, wherein the tree structure comprises a root node and wherein each of the capability nodes is a child node of the root node.

M25. The method according to any of the preceding embodiments, wherein the method comprises determining a state of the technical apparatus using the apparatus state data structure.

M26. The method according to the preceding embodiment, wherein determining a state of the technical apparatus comprises determining for each functionality of the technical apparatus whether it is present or missing.

M27. The method according to any of the preceding embodiments, wherein the method further comprises determining a cause for a missing functionality of the technical apparatus using the apparatus state data structure.

M28. The method according to the preceding embodiment, wherein the method further comprises outputting the cause for the missing functionality.

M29. The method according to any of the preceding embodiments, wherein the method further comprises recovering a missing functionality of the technical apparatus using the apparatus state data structure.

M30. The method according to any of the 3 preceding embodiments, wherein determining a cause for a missing functionality of the technical apparatus using the apparatus state data structure comprises using a reasoning system.

M31. The method according to the preceding embodiment, wherein the reasoning system is configured to determine the cause for the missing functionality based on each data field of the apparatus state data structure.

M32. The method according to any of the 2 preceding embodiments, wherein the reasoning system is implemented using logic programming.

M33. The method according to any of the 2 preceding embodiments, wherein the reasoning system comprises logical rules configured to determine the cause for the missing functionality.

M34. The method according to the preceding embodiment, wherein the logical rules are configured to categorize the causes for the missing functionality.

M35. The method according to any of the 2 preceding embodiments, wherein the logical rules comprise logical operations on the data fields of the apparatus state data structure.

M36. The method according to any of the preceding embodiments, wherein the method further comprises using an executor application.

M37. The method according to the preceding embodiment, wherein the executor application is a state machine executor application or a behavior tree executor application.

M38. The method according any of the 2 preceding embodiments, wherein the executor application determines the state of the technical apparatus using the apparatus state data structure.

M39. The method according to the preceding embodiments, wherein the executor application determines to execute tasks based on the determined state of the technical apparatus.

M40. The method according to any of the 4 preceding embodiments, wherein the executor application executes a task and simultaneously determines the state of the technical apparatus using the apparatus state data structure.

M41. The method according to the preceding embodiment, wherein the executor application calls a missing capability handler routine upon determining that a functionality is missing to determine a handling routine.

M42. The method according to the preceding embodiment, wherein the handling routine comprises recovering the missing capabilities.

M43. The method according to any of the 2 preceding embodiments, wherein the handling routine comprises generating a request for manual support.

M44. The method according to any of the 8 preceding embodiments and with the features of embodiment M30, wherein the executor application calls the reasoning system to determine a cause for a missing functionality, upon determining that a functionality is missing.

M45. The method according to the preceding embodiment and with the features of embodiment M41, wherein the missing capability handler routine determines the handling routine based on the output of the reasoning system.

M46. The method according to any of the preceding embodiments, wherein one of the at least one capability data field indicates a driving functionality of the technical apparatus.

M47. The method according to any of the preceding embodiments, wherein one of the at least one capability data field indicates a navigation functionality of the technical apparatus.

M48. The method according to any of the preceding embodiments, wherein one of the at least one capability data field indicates an object location functionality of the technical apparatus.

M49. The method according to any of the preceding embodiments, wherein one of the at least one capability data field indicates an object manipulation functionality of the technical apparatus.

M50. The method according to any of the preceding embodiments, wherein the technical apparatus comprises a drive unit configured to move the technical apparatus.

M51. The method according to any of the preceding embodiments, wherein the technical apparatus comprises a pick up unit configured to pick up at least one object.

M52. The method according to the preceding embodiment, wherein the pick up unit comprises at least one gripper.

M53. The method according to any of the preceding embodiments, wherein the technical apparatus comprises a shelf unit configured to store at least one object.

M54. The method according to any of the preceding embodiments, wherein the technical apparatus comprises an emergency button.

M55. The method according to any of the preceding embodiments, wherein the technical apparatus comprises a sensor.

M56. The method according to any of the preceding embodiments, wherein the technical apparatus is configured to pick up objects.

M57. The method according to any of the preceding embodiments, wherein the method is a computer implemented method.

M58. The method according to any of the preceding embodiments, wherein the method is performed by a system comprising the technical apparatus and a processor.

M59. The method according to the preceding embodiment, wherein the system further comprises a memory device.

M60. The method according to any of the preceding embodiments, wherein the technical apparatus is a robot.

M61. The method according to any of the 3 preceding embodiments, wherein the technical apparatus comprises the processor.

M62. The method according to any of the preceding embodiments and with the features of embodiment M36, wherein the executor application comprises a state generator node configured to generate the apparatus state data structure.

M63. The method according to the preceding embodiment, wherein the state generator node is a process.

M64. The method according to any of the 2 preceding embodiments, wherein the state generator node generates the apparatus state data structure periodically.

M65. The method according to preceding embodiment, wherein the state generator node generates the apparatus state data structure with a frequency of at least 1 Hz.

M66. The method according to any of the 2 preceding embodiments, wherein the state generator node generates the apparatus state data structure according to an adaptive frequency.

M67. The method according to the preceding embodiment, wherein the adaptive frequency depends on at least one of the capability data fields and/or on at least one of the associated data fields.

M68. The method according to any of the 6 preceding embodiments, wherein the executor application comprises a plurality of process nodes, wherein the state generator node is one of the process nodes and wherein the state generator node is configured to receive the output of at least one other process node to generate the apparatus state data structure.

M69. The method according to any of the preceding embodiments, wherein the method comprises storing in a memory device the apparatus state data structure.

M70. The method according to the preceding embodiment and with the features of embodiment M62, wherein the method comprises the state generator node generating and storing the apparatus state data structure.

M71. The method according to any of the 2 preceding embodiments, wherein the method comprises storing a respective timestamp associated to the apparatus state data structure, the respective timestamp being configured to indicate a time of generation of the apparatus state data structure.

M72. The method according to any of the 3 preceding embodiments and with the features of embodiment M25, wherein the method comprises determining a past state of the technical apparatus using a stored apparatus state data structure.

M73. The method according to any of the preceding embodiments, wherein the technical apparatus is an autonomous vehicle.

Below system embodiments will be discussed. These embodiments are abbreviated by the letter "S" followed by a number. Whenever reference is made to system embodiments, these embodiments are meant.

S1. A system comprising a technical apparatus; and a memory device configured to store an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field.

S2. The system according to the preceding embodiment, wherein the system is configured to carry out the method according to any of the preceding method embodiments.

S3. The system according to any of the preceding system embodiments, wherein the apparatus state data structure is configured to comprise any of the features of the apparatus state data structure used by the method according to any of the preceding method embodiments.

S4. The system according to any of the preceding system embodiments, wherein the technical apparatus comprises the memory device.

S5. The system according to any of the preceding system embodiments, wherein the memory device is configured to further store the reasoning system of embodiment M30.

S6. The system according to any of the preceding system embodiments, wherein the memory device is configured to further store the executor application of embodiment M36.

S7. The system according to any of the preceding system embodiments, wherein the technical apparatus is configured according to embodiments M50 to M56.

S8. The system according to any of the preceding system embodiments, wherein the system further comprises a processor.

S9. The system according to any of the preceding system embodiments, wherein the technical apparatus is a robot.

S10. The system according to any of the 2 preceding embodiments, wherein the technical apparatus comprises the processor.

S11. The system according to embodiment S8 or S10, wherein the processor executes the method according to any of the preceding method embodiments.

S12. The system according to any of the preceding system embodiments, wherein the technical apparatus is an autonomous vehicle.

Below computer program product embodiments will be discussed. These embodiments are abbreviated by the letter "A" followed by a number. Whenever reference is made to computer program product embodiments, these embodiments are meant.

A1. A computer program product comprising instructions which, when the program is executed by a computer, causes the computer to carry out the method according to any of the preceding method embodiments.

A2. The computer program product according to the preceding embodiment, wherein the technical apparatus comprises the computer.

A3. The computer program product according to the penultimate embodiment, wherein the computer is a server external to the technical apparatus.

Below computer readable storage medium embodiments will be discussed. These embodiments are abbreviated by the letter "B" followed by a number.

B1. A first computer readable storage medium having stored thereon the computer program product according to any of the preceding computer program product embodiments.

B2. A second computer readable storage medium having stored thereon the apparatus state data structure used by the method according to any of the preceding method embodiments.

BRIEF DESCRIPTION OF THE DRAWINGS

FIG. 4 illustrates an exemplary reasoning system configured to determine using the apparatus state data structure the cause of an error.

DETAILED DESCRIPTION

Figure 1:
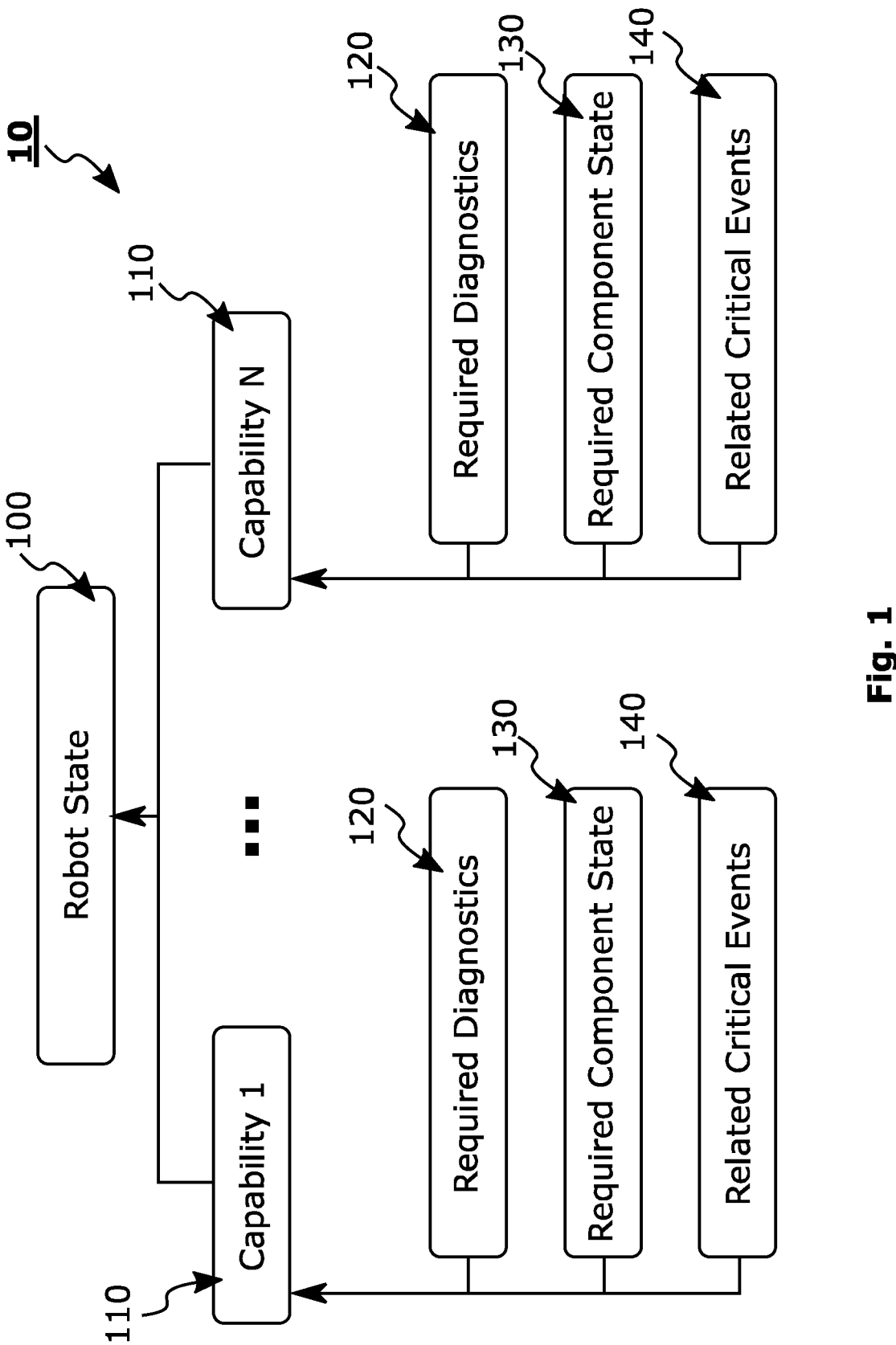
FIG. 1 provides a schematic of an apparatus state data structure.

FIG. 1 illustrates an apparatus state data structure that can be configured to represent a state of a technical apparatus that can for example be a robot. For example, the technical apparatus may be an autonomous vehicle and/or a robot. While in the following, embodiments will be described with reference to a robot (cf., data structure 100 labelled as "robot state"), it should be understood that this is merely exemplary and that the present technology may also be used to operate a technical apparatus, which is different from a robot.

The robot can be modelled as having a set of capabilities that allow it to perform tasks. Every type of task assigned to the robot can thus be associated with a set of required capabilities to complete it. For example, a task of moving to a position requires the robot to be able to correctly move its base, thus to have a navigation capability. The task of picking up an object, instead, requires the robot to be able to move in front of the object, locate it, and manipulate it. Thus, such requirements imply that the robot may require navigation, object location, and object-manipulation capabilities to be enabled for the robot to pick up an object.

In view thereof, the robot errors can be defined as the circumstances in which a robot is missing capabilities. Using different types of information available in the robot to compute the capabilities, the features of the present disclosure can allow determining what the robot can and cannot do at any moment in time. Moreover, by having explicit modeling of task requirements, the features of the present disclosure allow explaining and/or reporting, in case of missing capabilities, the reason hindering the robot from achieving a particular goal. Specifically, the aforementioned information is structured in a compact representation that can be referred to as an apparatus state data structure 10, or, interchangeably, as robot state representation 10 or as a vehicle state data structure 10.

The robot state representation 10 can comprise a plurality of data fields 100, 110, 120, 130, 140. In particular, the robot state representation 10 can comprise capability data field(s) 110 and associated data fields 120, 130, 140, such that each associated data field 120, 130, 140 can be associated with a respective capability data field 110. Each capability data field 110 can be configured to indicate a respective functionality (interchangeably referred to as capability) of the robot. A functionality can be present (i.e., enabled) or missing (i.e., disabled). A functionality can be present when the respective capability data field 110 is enabled. A functionality can be missing when the respective capability data field 110 is disabled. On the other hand, each associated data field 120, 130, 140 can be configured to facilitate determining whether the respective capability data field 110 is enabled or disabled.

In some embodiments, the robot state representation 10 can comprise a modular structure, wherein each capability data field 110 can be connected to at least one associated data field 120, 130, 140. In other words, each capability data field 120, 130, 140 can be associated with a respective capability data field 110. In such embodiments, the association between a capability data field 110 and an associated data field 120, 130, 140 can be configured to indicate a membership of the associated data field 120, 130, 140 on the capability data field 110.

In some embodiments, the robot state representation 10 can comprise a hierarchical structure, wherein each capability data field 110 can comprise a higher hierarchical level than the associated data fields 120, 130, 140. For example, the robot state representation 10 can comprise a tree structure, wherein each data field 100 to 140 can be a node of the tree structure. That is, each capability data field 110 can be a capability node 110 and each associated data field 120, 130, 140 can be a capability enabling node 120, 130, 140. Moreover, each capability node 110 can be a parent node of at least one capability enabling node 120, 130, 140 and each capability enabling node 120, 130, 140 can comprise a parent capability node 110. The tree can comprise a robot state node 100, which can be the root node 100 of the tree. In such embodiments, the association between a capability data field 110 and an associated data field 120, 130, 140 can be configured to indicate a hierarchical relation between the capability data field 110 and the associated data field 120, 130, 140.

Functionalities of a technical apparatus can depend on different requirements. For example, a functionality may require certain components to be operational and/or in a predetermined state. Moreover, certain events that may have occurred can hinder some of the capabilities of the robot. Therefore, the robot state representation 10 can comprise different types of associated data fields 120, 130, 140 for representing different capability requirements. More particularly, the robot state representation 10 can comprise required diagnostics data field 120, required component state data field 130 and event storage data field 140.

That is, four different types of information can be encoded in an apparatus state data structure 10.

The first information can include robot capabilities (i.e., capability data fields 110), which can be key-value pairs 110 configured to represent what the robot can do at a certain moment in time (e.g., if the robot can locate, navigate, or manipulate).

The second information can include component states (i.e., required component state date field(s)), which can comprise key-value pairs representing a state into which a robot component currently is (e.g., if the robot has its battery in a critical or full charging state). Each required component state data field 130 can be configured to indicate the state of one required component or the state of a plurality of required components, for a respective functionality of the robot. For example, a functionality may require a plurality of components to be in a predetermined state. In this case, the robot state representation 10 can comprise, associated to the respective capability data field 110, a plurality of required component state data fields 130, each configured to indicate the state of a respective required component. Alternatively, the robot state representation 10 can comprise, associated to the respective capability data field 110, one required component state data field 130 configured to indicate the state of each required component.

The third information can include diagnostics (i.e., required diagnostic data field 120), which can be standard robot operation system (ROS) diagnostic messages configured to represent if a hardware or software component is behaving correctly or if it has an error (e.g., if the motors are operational or if the lasers are reporting correctly their readings). Similarly to the above, each required diagnostic data field 120 can be configured to indicate the operational status of one required component or the operational status of a plurality of required components, for a respective functionality of the robot.

The fourth information can relate to critical events (i.e., event storage data field 140), which can comprise entries in a database table representing events happening at a given point in time, which cannot be continuously observed (e.g., the event of hitting a shelf with a gripper).

It will be understood that each capability data field 110 can be associated at least one required diagnostics data field 120, at least one required component state data field 130, at least one event storage data field 140 or any combination thereof. Moreover, each capability data field 110 can comprise a plurality of associated data fields 120, 130, 140 of the same type. The latter is particularly the case if the associated data fields 120, 130 relate only to a single component.

With such a detailed and explicit representation of the apparatus state provided by the apparatus state data structure 10, upon errors, a high-level executor (e.g., a state machine based or behavior tree based executor) can call a reasoning system (implemented, for example, with a logic programming language like Prolog) that can perform reasoning on the current state and deduce the cause of a given missing capability and thus the best recovery behavior to be adopted.

Figure 2:
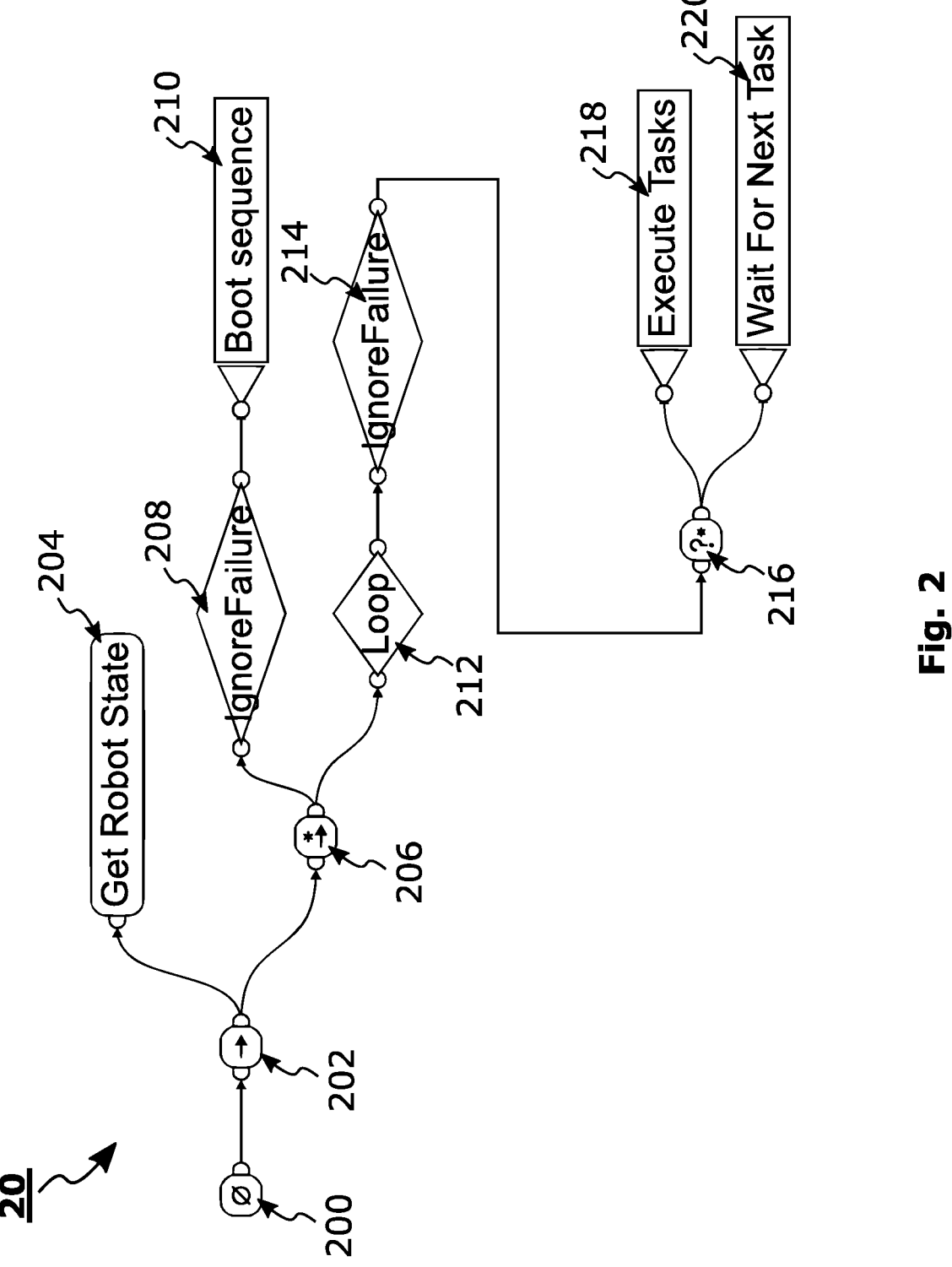
FIG. 2 illustrates an exemplary behavior tree executor application using the apparatus state data structure to execute tasks.

FIG. 2 illustrates an executor application 20 that can use the apparatus state data structure 10. The executor application 20 illustrated in FIG. 2 is a behavior tree executor application, which for the sake of brevity can also be interchangeably referred to as a behavior tree 20.

The behavior tree 20 can comprise a root node 200, which can be the initial node to be called to traverse the behavior tree 20. It can further comprise composite nodes 202, 206, 216 which are nodes that can have one or more child nodes. They will process one or more of their children according. The composite nodes 202, 206, 216 can be configured to return to their parent the status RUNNING, while their child nodes are being executed and running, the status SUCCESS when at least one or all of their child nodes successfully executes and the status FAILURE when at least one or all of their children fails to execute. The behavior tree 20 can further comprise decorator nodes 208, 212, 214. These are nodes that can comprise only one child node. They are typically configured to transform the result they receive from their child node's status, to terminate the child, or repeat processing of the child, depending on the type of decorator node 208, 212, 214. The behavior tree 20 can further comprise leaf nodes 204, 210, 218, 220. These are the lowest level node types and do not comprise any child nodes. These nodes typically comprise programs or tasks to be executed. The leaf nodes leaf nodes 204, 210, 218, 220 can comprise calls to other applications and/or other behavior trees.

The root node 20 can call a first sequence node 202, which can be a child node to the root node 200. The first sequence node 202 can be configured to sequentially call its child nodes 204, 206.

More particularly, the first sequence node 202 can first call the get robot state node 204. The get robot state node 204 can utilize the apparatus state data structure 10, illustrated in FIG. 1, to determine the state of the robot. For example, the get robot state node 204 can determine which of the capabilities of the robot are present or missing.

After the completion of the get robot state node 204, the first sequence node 202 can call the second sequence node 206, which can be configured to sequentially call its child nodes 208 and 212. The second sequence node 206 can be a memory sequence node, i.e., a sequence node with memory.

Figure 3:
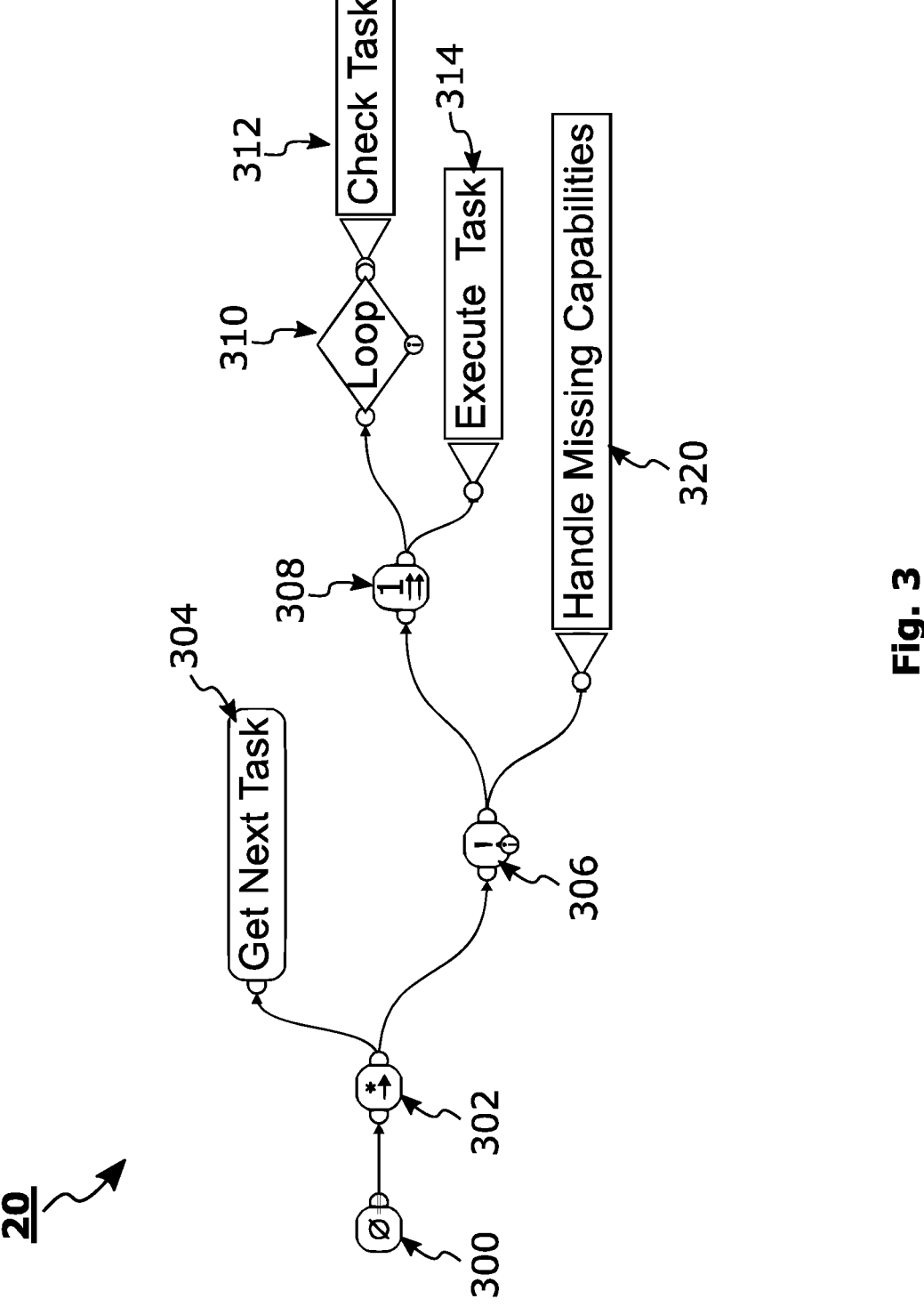
FIG. 3 illustrates another example of the behavior tree executor application.

A memory sequence node can be configured to remember the last running child node and can jump back to it in the next tick, i.e., it does not start the execution of its children with the first child node (as typical sequence nodes without memory do). That is, the memory sequence nodes can be configure to call its child nodes one after another, starting from the child that has been running in the previous iteration. When a child node succeeds, the memory sequence node can continue with the next child. when a child fails, the memory sequence node fails as well. When all children succeed, the memory sequence node succeeds. The memory feature of a sequence node is indicated in FIGS. 2 and 3 with a star "*".

More particularly, the second sequence node 206 can call the boot sequence node 210 via proxy of the first ignore failure node 208. The first ignore failure node 208, which can be a decorator node 208, can be configured to return SUCCESS when its child node, respectively the boot sequence node 210, returns SUCCESS or FAILURE, and return RUNNING when its child node returns RUNNING. The boot sequence node 210 causes the robot to be initialized. After the bot sequence node 210 finishes execution, the first ignore failure node 208 returns SUCCESS. This causes the second sequence node 206 to call its second child node 212.

In particular, the second sequence node 206 calls a selector node 216 via proxy of the decorator nodes 212, 214. The decorator node 212 is a loop node 212 which recalls its children at the end of their execution. The decorator node 214 is a second ignore failure node 214 which has the same functionality as the first ignore failure node 208.

The selector node 216 can be configured to start with calling their respective designated first child node. If a ticked child node returns RUNNING, selector node 216 can also return RUNNING. If one child node returns SUCCESS, the selector node 216 succeeds as well and does not execute any further child nodes. If all child nodes return FAILURE selector node 216 can also return FAILURE. The selector node 216 can be a memory selector node, i.e., a selector node with memory.

A memory selector node can be configured to remember the last running child and can jump back to it in the next tick, i.e., it does not start the execution of its children with the first child. That is, a memory selector node can call its child nodes one after another, starting from the child that has been running in the previous iteration. If one child succeeds, the memory selector node succeeds as well and does not execute any further children. When one child fails, the memory selector node can continue with the next one. If all children fail, the memory selector node fails as well.

The memory feature of a selector node is indicated in FIGS. 2 and 3 with a star "*".

In the behavior tree 20 illustrated in FIG. 2, the selector node 216 initially calls its first child node which is the execute tasks node 218. The execute tasks node 218, which is a leaf node, can cause the robot to perform the tasks that are assigned to the robot. If the execute tasks node 218 fails, the selector node 216 calls its second child, wait for next task node 220, which causes the robot to wait for the next task.

That is, in the behavior tree 20 illustrated in FIG. 2, at every tick, the previously described robot state representation is retrieved (node 204) and used, after having initialized the robot (node 210), in a while-true loop (node 212) to execute tasks (node 218).

FIG. 3 illustrates another example of a behavior tree executor application 20. In the depicted example, after being tasked, the plan related to the current task is executed while checking the availability of the capabilities required for the task. In a negative case, the behavior tree enters the subtree in charge of recovery of the missing capabilities and, upon failure, in charge of reporting the error to the outside.

More particularly, the depicted behavior tree can comprise a root node 300 and a first sequence node 302. The first sequence node 302 can call the get next task node 304. The get next task node 304 can, for example, access a task queue (not shown) and can retrieve from therein a task to be accomplished. For example, the task queue can be a priority or ordered queue and the task with the highest priority is retrieved.

After being tasked by node 304, the first selector node 302 can call recovery node 306 which comprises nodes 308 and 320 as child nodes.

The recovery node 306 can execute the first child node (in this case node 308) as a main task and will try the other child nodes (in this case node 320) one after the other to recover from failures in the main task. If the first child node succeeds, the recovery node 306 succeeds as well and does not execute any other children. If the first child node fails, it continues with the other children until one of them succeeds. In this case, it continues with the first child. If all children fail, the recovery task fails as well. The recover node 308 can allow to compactly implement a recovery behavior. This can be advantageous when using behavior trees for controlling physical robots that operate in complex and uncertain environments. In these cases, actions may often fail and routines for recovering from failures may account for large parts of a robot's control program.

Thus, the recovery node 306 allows to execute tasks in the nodes branching from the first child node 308 and in case this fails will try to recover from this failure by calling the handling missing capability node 320.

The parallel node 308 can be configured to call its child nodes in such a way that the child nodes execute their associated task simultaneously to each other. When the parallel node 308 calls its child nodes, at least two child nodes of the parallel node 308 may be in the state RUNNING. The parallel node 308 therefore simultaneously calls the loop node 310 and the execute task node 314. In turn, the loop node 310 causes the check task node 312 to be re-called upon successful completion of its execution, therefore causing the check task node 312 to be executed in a loop fashion.

In other words, after being tasked by the get next task 304, the behavior tree 20 traverses to executing in parallel the check task node 312 and the execute task node 314. The check task node 312 can be configured to determine whether the capabilities required for the assigned task are present or not. For example, the check task node 312 can first determine what capabilities are required for the assigned task and after that it can determine whether the required capabilities are present or not. The check task node 312 can, for example, trigger accessing a memory device which stores a mapping between tasks and required capabilities for each task. To determine whether the required capabilities are present or missing, the check task node 312 can use the robot state representation 10 (illustrated in FIG. 1). In parallel to this, the execute task node 314 executes the assigned task.

The parallel node 308 can further be configured to return RUNNING when at least one of its children is running, SUCCESS if more than one of its children succeed and to return FAIL otherwise. Therefore, if the check task node 312 fails (i.e., there is at least one required capability that is missing) or if the execute task node 314 fails (i.e., the task cannot be completed), the handle missing capabilities node 320 is called by node 306.

The handle missing capabilities node 320 can perform reasoning on the missing capabilities and can deduce from the robot state representation 10 (see FIG. 1) the cause of the error. For this, the handle missing capabilities node 320 can call a reasoning system.

FIG. 4 illustrates an exemplary reasoning system 40. In the illustrated representation, the reasoning system 40 is implemented using a logic programming language, such as, SWI-prolog, wherein logical rules are encoded and used to categorize and explain the causes of errors happening on the robot.

For example, the reasoning system illustrated in FIG. 4 relates to a robot configured to use lidar sensors to localize and move in an environment. FIG. 4a illustrates how a can_navigate capability of such a robot can be modelled or encoded. The can_navigate capability (specified in the first line of FIG. 4a) can require the output of the lidars to be always and constantly available. Therefore, associated to the can_navigate capability, the requirement for the laser data to be available is provided as one of the required diagnostics for the can_navigate capability, said diagnostic named "/laser_data_available" (line 2 and 5-7 of FIG. 4b).

FIG. 4a actually illustrates a portion of the apparatus state data structure, wherein the can_navigate capability can be a capability data field 110 and the required diagnostics "/laser_data_available" can be a required diagnostics data field 120 or a part of a required diagnostic data field 120.

The reasoning system 40 can comprise a set of logical rules configured to deduce the cause of the error when the diagnostic returns an error. FIG. 4b illustrates a set of logical rules for deducing and reporting the cause of the error, when the "/laser_data_available" diagnostic indicates an error. More specifically, the first line of FIG. 4b checks whether the error is due to laser data missing, the second line provides a more elaborate and human readable description of the error and the third line defines properties of the error.

A similar mechanism can be also adopted to deduce the causes of errors coming from wrong component state values or critical events. This will be further described with reference to FIG. 5.

Figure 5:
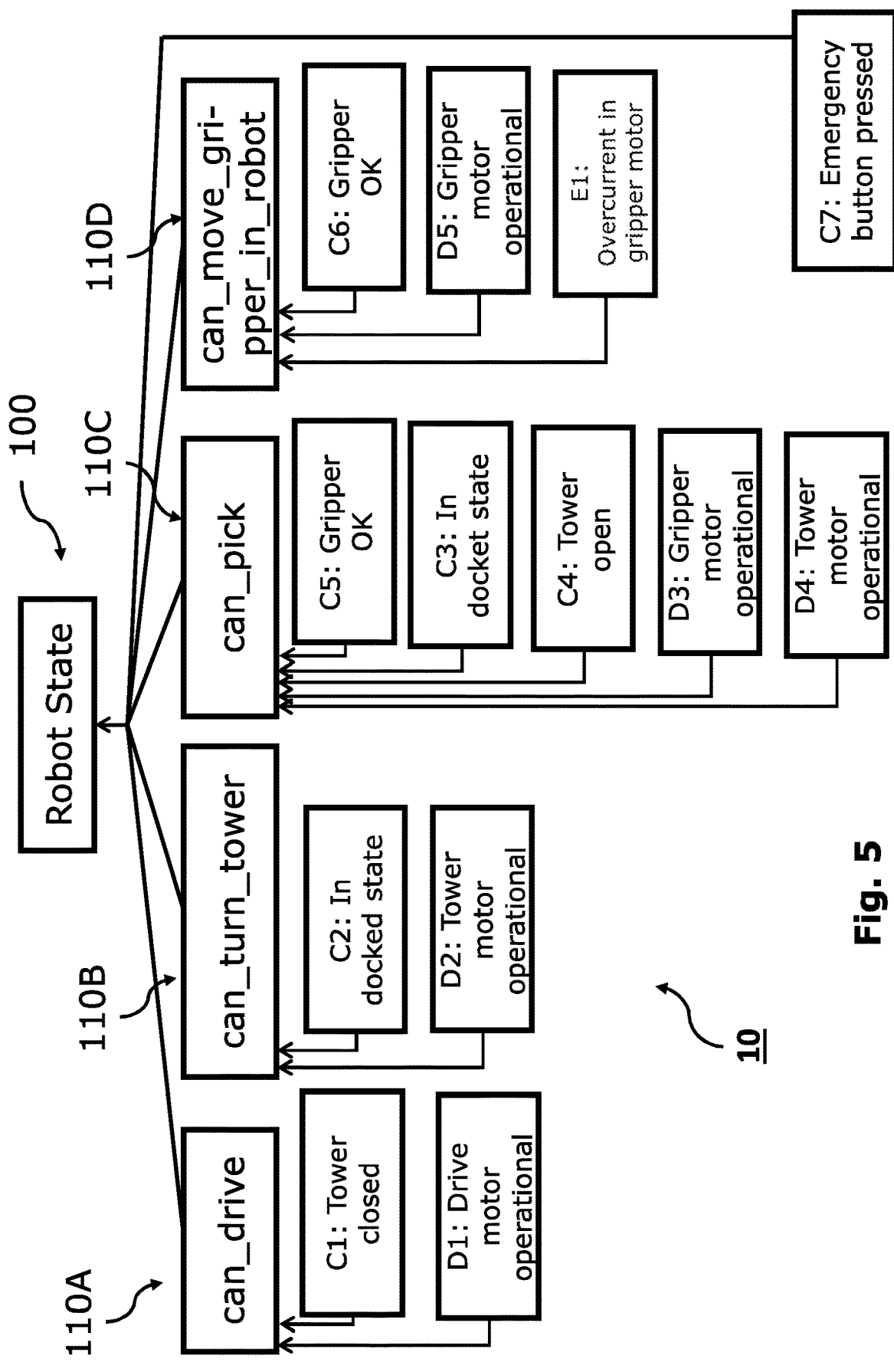
FIG. 5 illustrates an example of an apparatus state data structure.

FIG. 5 depicts an exemplary representation 10 of a robot state comprising a plurality of data fields. That is, while FIG. 1 provides a general illustration of the apparatus state data structure, FIG. 5 depicts a more detailed example of the apparatus state data structure 10. For the sake of brevity and understandability, in FIG. 5, the capability data fields 110 are referred to by the numeral "110" followed by a character, the required diagnostic data fields 120 are referred to by the character "D" followed by a number, the required component state data fields 130 are referred to by the character "C" followed by a number and the event storage data fields 140 are referred to by the character "E" followed by a number. That is, the enabling data fields 120, 130, 140 are referred by characters "D", "C" and "E", respectively followed by a number.

The robot state representation 10 can comprise an apparatus state data field 100 (interchangeably referred to as robot state data field 100 or as a vehicle state data field 100) which can represent the state of the apparatus. Moreover, the robot state representation 10 can comprise a plurality of capability data fields 110. The robot state data field 100 can be directly associated with each capability data field 110. This can allow the robot state data field 100 to comprise data indicative of each of the capability data fields 110. For example, the robot state data field can indicate the presence or missing of each of the capabilities 110A-110D.

Furthermore, also a component state data field C7 can be directly associated with the robot state data field 100.

Therefore, the robot state data field 100 can further indicate the state of the component of 120A (i.e., of the emergency button).

Generally, the state representation depicted in FIG. 5 can be used for operating a robot as disclosed, e.g., in WO 2017/121747 A1 (although it will be understood that this is merely exemplary).

Such a robot may comprise different capabilities or functionalities. The terms capability and functionality are used interchangeably throughout the description. A first capability may be that the robot is able to drive, i.e., to change the location of its base. This is represented by the respective capability data field 110A.

Another capability may be that the robot is able to turn its tower (referred to as pick up unit in WO 2017/121747 A1), and this capability is represented by capability data field 110B in FIG. 5.

A still further capability is that the robot is able to pick up an object by means of its gripper (referred to as pick up device in WO 2017/121747 A1), which is represented by capability data field C7 in FIG. 5.

Furthermore, the robot may also comprise the ability to move the gripper (i.e., the pick up device) inside the robot, e.g., to place an item that has been picked up into on onboard shelf unit of the robot. This functionality is represented by capability data field 110D in FIG. 5.

All these capability data fields 110A-110D are further associated with the associated data fields Cn, Dn, and En. The associated data fields relate to required components states (data fields Cn), required diagnostics (data fields Dn), and reported events (data field En).

For example, the can_drive capability data field 110A requires the tower to be closed (e.g., such that the gripper may not extend out of the tower for security reasons), i.e., this is the component state C1 the tower is required to be in for the can_drive capability to be enabled (i.e., present). Furthermore, the can_drive capability data field 110 also requires the diagnostic state D1, i.e., that the drive motor is operational.

The can_turn_tower capability data field 110B requires the component state C2, i.e., that the robot is in a docked state and diagnostic state D2, that the tower motor is operational.

More particularly, in some embodiments, the robot may be operated in an environment. To ensure safety of operation, the robot may comprise an obstacle sensor, which may have a monitoring area. When the obstacle sensor senses an obstacle in the monitoring area, the robot or a module thereof may be switched to a safe operation mode. For example, a velocity with which the robot moves may be reduced in the safe operation mode. Therefore, to increase safety, some robot capabilities can be reduced when an obstacle is detected.

However, in some embodiments, the environment may comprise closed contours. For example, the closed contours may be formed by shelves of a warehouse wherein the robot operates. The closed contours may as well be formed by walls. In some embodiments, the closed contours may be placed at a distance of, e.g., 1.5 m to one another. If operating a robot with a safety mechanism including a monitoring area as described above between such closed contours, the obstacle sensor would constantly sense an obstacle (i.e., the closed contours), and would thus switch into the safe operation mode, limiting its operation due to safety routines. This may not be ideal, as the robot would then (depending on the safety routine) either operate more slowly or stop at least a part of its operation completely.

To alleviate this, the robot can be configured to detect when it is between closed contours, i.e., when it is docked to a closed contour. Such a state is referred to as a docked state. In the docked state, the monitoring area can be reduced, for example, to include only the space between the closed contours (but not the contours). Thus, the obstacle sensor can be configured not to detect the contours as obstacles.

The robot can operate in a warehouse and can be configured to manipulate items stored in shelves. Thus, an area in front of the shelves represents an activity zone of the robot, wherein the robot is allowed to perform object manipulations tasks. As discussed, shelves in a warehouse may create the closed contours. Therefore, the robot being in a docked state can be an indication that the robot is close to a shelve and can therefore perform robot manipulation tasks (e.g., turning the tower).

Moreover, object manipulation actions (e.g., turning the tower, picking an item) can be performed without hindering safety, since, when the robot operates close to closed contours (such as shelves), it is unlikely that a human will move into the route of the robot from the side where the closed contour is located (due to tight space). Outside of the docked state it may not be safe or necessary to perform said actions.

Thus, the can_turn_tower capability 110B can be enabled only when the robot is in a docked state C2 and when the tower motor is operational.

Similarly, also the can_pick capability data field 110C can require that the robot is in the docked state C3 (as discussed above). In addition, it can require that the grippers are in a ready state (i.e., OK) such that they can be used to pick objects, as represented by the required component state data field C5. Furthermore, the can_pick capability can require the tower to be open such that items can be stowed therein after being picked, as represented by the required component state data field C4. The can_pick capability, as illustrated in FIG. 5, also required two diagnostics, in particular, that the gripper and the tower motors are operational, as represented by the required diagnostic data fields D3 and D4 respectively.

The can_move_gripper_in_robot can be another capability of the robot that can allow the robot to move the gripper within the robot. This can allow the robot to perform tasks, such as stowing an item in the shelf unit of the robot. The can_move_gripper_in_robot data field 110D, requires the gripper motor to be in a ready state (i.e., OK), such that it can be moved, as represented by the required component state data field C6. Moreover, the capability data field 110D requires a diagnostic of the gripper motor to indicate that the gripper motor is operational, as indicated by the required diagnostic data field D5. Further, the capability data field 110D also has a child data field realized as an event storage data field storing that an overcurrent in gripper motor has been detected, as indicated by the event storage data field E1.

Based on the robot state representation depicted in FIG. 5, assume that the robot is asked to perform a transport task. In this circumstance, four different events that might happen will be discussed with reference to the representation of the robot state. Based thereon, embodiments of the present technology may decide the best recovery behavior to be adopted in every situation:

The four exemplary situations that will be discussed are:
1. A human presses the emergency button of the robot.
2. A motor reports a problem while manipulating in the shelf on board.

3. The robot loses the docked state while searching for a box to be picked.
4. The robot collides the box in the gripper with a box stored on the onboard shelf.

In the first case, the robot state will report that most of the capabilities have been lost, given that, when the emergency button is pressed, the power is cut to all the motors of the robot. Additionally, the component state of the emergency button will report having a state value of 'pressed'. By combining this information and reasoning on the robot state at run time, embodiments of the present technology (e.g., a behavior tree and/or a reasoning system) are able to correctly classify that someone has stopped the robot and the best recovery behavior is to wait for the button to be released.

That is, in case an emergency button is pressed, none of the motors is supplied with power. With reference to FIG. 5, it will be understood that all of the diagnostic data fields D1 (indicating the operational state of the drive motor), D2 (indicating the operational state of the tower motor), D4 and D5 (both indicating the operational state of the gripper motor) are in a negative state. Thus, in this scenario, none of the capability data fields 110A to 110D would be enabled.

As described, the robot state tree depicted in FIG. 5 may also comprise a component state data field C7 relating to the state of the emergency button, which is active in the above-described scenario.

Thus, based on the states of the data fields D1, D2, D4, and D5, all the capability data fields 110A to 110D are disabled, and data field C7 indicates that the emergency button is pressed.

In such a state, it may be determined that most of the functionalities of the robot are disabled, and that the robot itself cannot take an active recovery, but has to wait for the emergency button to be released.

In the second case, a robot reports a problem while manipulating in the shelf on board. More particularly, the robot may report that the motor to turn the tower is currently not operational, i.e., that this motor is in a malfunctioning state. Due to this, the robot will be incapable of moving the tower and therefore it won't be able to complete any transport item task. More particularly, in response thereto, the diagnostic data fields D2 and D4 will be negative, such that the capability data fields 110B and 110C will not be functioning.

However, if the error occurred when the tower was closed, the robot can still navigate around and therefore is able to complete a charging task. That is, even if the tower cannot be turned (i.e., capability data field 110B is negative), the capability data field 110A can be positive in case that the component state C1 (tower closed?) is positive.

All the information to make this decision can be taken by the apparatus state data structure 10 (which may be a behavior tree), classifying the error as such by analyzing the diagnostics for the motor failure, and the capabilities to know that it can still navigate. Further, a reasoning system 40 as illustrated in FIG. 4 can be configured to make the above decision based on the apparatus state data structure 10.

In the third case, the robot has lost the docked state while repositioning to search for a specific barcode on a shelf. The docked state, as discussed, can be used to represent the state of the robot detecting with a safety certified sensor a shelf next to itself, and thus being allowed to manipulate objects. As the robot lost the docked state while being in the closed contours (i.e., between the shelves), the obstacle sensor will consider the shelves as obstacles. Hence, the safety system on the robot will cut the motors of the base (for safety purposes), leaving on the ones in the tower.

The robot state, through diagnostics, will report that the motors in the base are in a malfunctioning state. That is, the diagnostic data field D1 (indicating the operational status of the drive motors) will be negative. Additionally, the robot state will report in the component state that the robot has lost the docked state. That is, the required component state data fields C2 and C3 will indicate that the robot is not in the docked state.

Solely based on information stored in the robot state representation 10, an executor application 20 (e.g., a behavior tree) can determine that losing the docked state caused the drive motors to be in a malfunctioning state. In other words, it can be determined that the drive motors do not comprise any defect, but it was rather the safety system that cut the power to the drive motors. Therefore, the executor application can take the correct decision on how to proceed: e.g., close the tower to regain the safe state and continue executing the current task.

Finally, in the fourth case, while putting down a box into the onboard shelf, the robot collides the box in the gripper with another box on the onboard shelf. While doing so, the motors (or sensors provided therein) will measure for a short period of time an overcurrent. This event (i.e., the overcurrent in the gripper motor) can be logged in a critical events database.

The collision will cause the action of moving the gripper to stop. Since the current drawn by the motors will return to normal when the action is stopped due to the error, the diagnostics contained in the robot state will return to an "ok" state as soon as the current drawn by the motor returns to normal levels. That is, the component state data field C6 will indicate an OK state of the gripper motors and the required diagnostic data field D5 will indicate that the gripper motor is operational. However, the event storage data field E1, will indicate that an overcurrent was detected at the gripper motor. Therefore, using the information from the robot state representation 10, the can_move_gripper_in_robot capability 110D, can be disabled and the robot will wait for human inspection.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that these embodiments were provided for illustrative purpose only and should by no means be construed to limit the scope of the present disclosure, which is defined by the claims.

What is claimed is:

1. A method of operating a technical apparatus, wherein the method comprises using an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, and wherein the at least one capability data field, the at least one associated data field, and the at least one required diagnostic data field are encoded together in a structured representation to thereby define the apparatus state data structure.

2. The method according to claim 1, wherein each capability data field indicates the respective functionality of the technical apparatus based on each associated data field associated with the respective capability data field.

3. The method according to claim 1, wherein each capability data field comprises a capability key and a capability value, and wherein the capability key comprises a unique identifier corresponding to the respective functionality of the technical apparatus and the capability value indicates a status of the functionality.

4. The method according to claim 1, wherein each required component state data field comprises a component key and a component state value, and wherein the component key comprises a unique identifier corresponding to the respective component and the component state value indicates the configuration of the component.

5. The method according to claim 1, wherein each required diagnostic data field comprises a part of an output of a diagnostic routine, wherein the diagnostic routine is a general system diagnostic routine of the technical apparatus, and wherein the general system diagnostic routine generates a respective operational state for each component of the technical apparatus.

6. The method according to claim 1, wherein the at least one associated data field comprises at least one event storage data field, wherein each event storage data field comprises data relating to an event relevant for the respective functionality of the capability data field associated with the respective event storage data field.

7. The method according to claim 6, wherein the method comprises storing in a database data relating to critical events, and wherein each event storage data field comprises at least one entry of the database.

8. The method according to claim 7, wherein the method comprises triggering storage in the database of the data relating to critical events based on an output of at least one sensor of the technical apparatus.

9. The method according to claim 1, wherein the apparatus state data structure is an apparatus state tree structure, wherein the apparatus state tree structure comprises a plurality of nodes and a plurality of edges connecting the nodes, and wherein each capability data field is a capability node, and each associated data field is a capability child node.

10. The method according to claim 1, wherein the method comprises determining a state of the technical apparatus using the apparatus state data structure and wherein determining the state of the technical apparatus comprises determining for each functionality of the technical apparatus whether it is present or missing.

11. The method according to claim 1, wherein the method further comprises determining a cause for a missing functionality of the technical apparatus using the apparatus state data structure.

12. The method according to claim 11, wherein determining the cause for the missing functionality of the technical apparatus using the apparatus state data structure comprises using a reasoning system, and wherein the reasoning system is configured to determine the cause for the missing functionality based on each data field of the apparatus state data structure.

13. The method according to claim 12, wherein the reasoning system comprises logical rules configured to determine the cause for the missing functionality, and wherein the logical rules comprise logical operations on the data fields of the apparatus state data structure.

14. The method according to claim 1, wherein the method further comprises recovering a missing functionality of the technical apparatus using the apparatus state data structure.

15. The method according to claim 1, wherein the method further comprises using an executor application, and wherein the executor application determines the state of the technical apparatus using the apparatus state data structure.

16. The method according to claim 15, wherein the executor application determines to execute tasks based on the determined state of the technical apparatus.

17. The method according to claim 1, wherein the technical apparatus is a robot configured to locate, pick up, store and transport items in a warehouse.

18. The method according to claim 17, wherein the robot comprises a processor and wherein the processor executes the method according to claim 1.

19. A system comprising:

a technical apparatus, and a memory device configured to store an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, and wherein the at least one capability data field, the at least one associated data field, and the at least one required diagnostic data field are encoded together in a structured representation to thereby define the apparatus state data structure.

20. A computer readable storage medium having stored thereon an apparatus state data structure, wherein the apparatus state data structure comprises at least one capability data field, wherein each capability data field indicates a respective functionality of a technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, and wherein the at least one capability data field, the at least one associated data field, and the at least one required diagnostic data field are encoded together in a structured representation to thereby define the apparatus state data structure.

21. A method of operating a technical apparatus, wherein the method comprises using an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, wherein the method further comprises determining a cause for a missing functionality of the technical apparatus using the apparatus state data structure, wherein determining the cause for the missing functionality of the technical apparatus using the apparatus state data structure comprises using a reasoning system, wherein the reasoning system is configured to determine the cause for the missing functionality based on each data field of the apparatus state data structure, wherein the reasoning system comprises logical rules configured to determine the cause for the missing functionality, and wherein the logical rules comprise logical operations on the data fields of the apparatus state data structure.

22. The method according to claim 21, wherein each capability data field indicates the respective functionality of the technical apparatus based on each associated data field associated with the respective capability data field.

23. The method according to claim 21, wherein each capability data field comprises a capability key and a capability value, and wherein the capability key comprises a unique identifier corresponding to the respective functionality of the technical apparatus and the capability value indicates a status of the functionality.

24. The method according to claim 21, wherein each required component state data field comprises a component key and a component state value, and wherein the component key comprises a unique identifier corresponding to the respective component and the component state value indicates the configuration of the component.

25. The method according to claim 21, wherein each required diagnostic data field comprises a part of an output of a diagnostic routine, wherein the diagnostic routine is a general system diagnostic routine of the technical apparatus, and wherein the general system diagnostic routine generates a respective operational state for each component of the technical apparatus.

26. The method according to claim 21, wherein the at least one associated data field comprises at least one event storage data field, wherein each event storage data field comprises data relating to an event relevant for the respective functionality of the capability data field associated with the respective event storage data field.

27. The method according to claim 26, wherein the method comprises storing in a database data relating to critical events, and wherein each event storage data field comprises at least one entry of the database.

28. The method according to claim 27, wherein the method comprises triggering storage in the database of the data relating to critical events based on an output of at least one sensor of the technical apparatus.

29. The method according to claim 21, wherein the apparatus state data structure is an apparatus state tree structure, wherein the apparatus state tree structure comprises a plurality of nodes and a plurality of edges connecting the nodes, and wherein each capability data field is a capability node, and each associated data field is a capability child node.

30. The method according to claim 21, wherein the method comprises determining a state of the technical apparatus using the apparatus state data structure and wherein determining the state of the technical apparatus comprises determining for each functionality of the technical apparatus whether it is present or missing.

31. The method according to claim 21, wherein the method further comprises recovering a missing functionality of the technical apparatus using the apparatus state data structure.

32. The method according to claim 21, wherein the method further comprises using an executor application, and wherein the executor application determines the state of the technical apparatus using the apparatus state data structure.

33. The method according to claim 32, wherein the executor application determines to execute tasks based on the determined state of the technical apparatus.

34. The method according to claim 21, wherein the technical apparatus is a robot configured to locate, pick up, store and transport items in a warehouse.

35. The method according to claim 34, wherein the robot comprises a processor and wherein the processor executes the method according to claim 1.

36. A system comprising:

a technical apparatus, and a memory device configured to store an apparatus state data structure for controlling the technical apparatus, wherein the apparatus state data structure comprises at least one capability data field, wherein each capability data field indicates a respective functionality of the technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, wherein the memory device is configured to further store a reasoning system, wherein the reasoning system is configured to determine a cause for a missing functionality of the technical apparatus using the apparatus state data structure, wherein the reasoning system is configured to determine the cause for the missing functionality based on each data field of the apparatus state data structure, wherein the reasoning system comprises logical rules configured to determine the cause for the missing functionality, and wherein the logical rules comprise logical operations on the data fields of the apparatus state data structure.

37. A computer readable storage medium having stored thereon an apparatus state data structure, wherein the apparatus state data structure comprises at least one capability data field, wherein each capability data field indicates a respective functionality of a technical apparatus, wherein the apparatus state data structure comprises at least one associated data field, wherein each associated data field is associated with a respective capability data field, wherein the at least one associated data field comprises at least one required component state data field and at least one required diagnostic data field, wherein each required component state data field indicates a configuration of a respective component required for the functionality of the capability data field associated with the respective required component state data field, wherein each required diagnostic data field indicates a respective operational state of a component of the technical apparatus required for the functionality of the capability data field associated with the respective required diagnostic data field, wherein the computer readable storage medium has further stored thereon a reasoning system, wherein the reasoning system is configured to determine a cause for a missing functionality of the technical apparatus using the apparatus state data structure, wherein the reasoning system is configured to determine the cause for the missing functionality based on each data field of the apparatus state data structure, wherein the reasoning system comprises logical rules configured to determine the cause for the missing functionality, and wherein the logical rules comprise logical operations on the data fields of the apparatus state data structure.

* * * * *